INVENTORS
RICHARD V. BAUM
GREGORY L. MARTIN
BY:
Oldham & Oldham
ATTORNEYS

3,383,677
**RADAR DATA COMPUTER AND
INDICATOR SYSTEM**
Richard V. Baum and Gregory L. Martin, Phoenix, Ariz., assignors to Goodyear Aerospace Corporation, Akron, Ohio, a corporation of Delaware
Continuation-in-part of applications Ser. No. 328,640, Dec. 6, 1963, and Ser. No. 507,619, Oct. 22, 1965.
This application Oct. 24, 1966, Ser. No. 589,026
10 Claims. (Cl. 343—5)

ABSTRACT OF THE DISCLOSURE

The invention relates to a radar data computing and display system which can simultaneously track, compute, and visually display present and future relationships between a carrying vessel and a plurality of target vessels to simplify the problem of collision avoidance of moving vehicles by providing an automatic tracker which instantaneously displays the present situation and the predicted display of the future situation based on the facts of the present situation on a standard radar display scope.

---

The present invention is a continuation-in-part of our application Ser. No. 328,640 filed Dec. 6, 1963, and application Ser. No. 507,619 filed Oct. 22, 1965, both now abandoned, and relates to a radar data computing and display system usable in conjunction with a carrying vessel's ordinary equipment and more particularly to a radar computer and display apparatus which can simultaneously track, compute, and visually display present and future relationships between the carrying vessel and a plurality of target vessels.

The navigational instruments used in moving vessels, such as aircraft and ships, provide the vessel's navigator with information concerning the present situation. These instruments do not predict or visually display future situations. Heretofore the predicted future positions of the vessel relative to other vessels have been determined by collecting position data over a period of time and developing plots either mentally or on paper to determine closest points of approach, relate movement, privileged and burden vessel, and the best course of action to take to avoid any possibility of collision.

Both mental reckoning and chart board plotting lead to difficulties. The mind, even after long training, is simply not well adapted to remembering accurately, over long time intervals, the relative position and time details that are necessary to determine a future situation. Chart board plotting relieves the memory, but can lead to mathematical and graphical errors. In the complex situations in which plots could be of the most use, the press of other duties often prevents their being revised often enough to provide the desired prediction of what would happen as a result of various probable course or speed changes. Also, the use of a plot is slow and its accuracy is dependent upon the accuracy of the person constructing the plot.

The general object of the invention is to provide a rugged, low cost, and easily maintained radar data computer which is compatible with well known radar equipment and simplifies the problem of collision avoidance of moving vehicles by providing an automatic tracker and data computer which gives instantaneous display of the present situation, and a predicted display of the future situation based on the facts of the present situation.

Another object of the invention is to provide a radar computing apparatus which visually displays radar data to indicate the present position of detected targets indicating their course and speed.

Another object of the invention is to provide a radar data computing and display system that does not require cooperative equipment or actions by other vehicles.

Another object of the invention is to provide a radar computing apparatus which visually displays expected future positions of tracked targets thereby permitting maneuvers to avoid a collision situation.

Another object of the invention is to provide a radar computing apparatus which visually and audibly indicates when the carrying vehicle is in danger of a possible collision, and which indications are given at least twice at times far enough in advance to make early evasive action possible to avoid the collision.

Another object of the invention is to provide a radar data computer which contains a built-in test target generator system which can be used to test the operation of the whole system.

Another object of the invention is to provide a radar data computer which will automatically track a target even if the target enters a fade area, with such tracking being based on the last known course and speed.

Another object of the invention is to provide a radar computing apparatus which visually displays when a target is in a fade, and which visually displays when a target is in a manuvering condition.

The aforesaid objects of the invention, and other objects which will become apparent as the description proceeds, are achieved by providing in combination radar means for detecting the presence of a plurality of targets, target tracking and data computer means operatively connected to the radar means to receive the output signals therefrom for separately and continuously tracking each detected target and visually displaying a plot of the tracked targets to indicate their present course and speed, their future predicted position, and their closest point of approach to the carrying vehicle, the target tracking means comprising a plurality of independent tracking circuits having output signals which are a function of the position of the detected targets, the output signals from the tracking means driving the computer to predict the future position of the target tracked, acquisition circuit means operatively connected to each tracking circuit means for automatically acquiring targets which enter the field of view of the radar system, and cathode-ray tube means operatively connected to the data computer to receive the output signals therefrom to visually display the position and predicted course and speed of the tracked targets.

For a better understanding of the invention reference should be had to the accompanying drawings, wherein.

Although the principles of the invention are broadly applicable to combining any type of necessary circuitry to track and compute future relative positions of targets in relationship to the carrying vehicle, the invention has been designed for combination with a standard shipboard radar system, and hence it has been so illustrated and will be so described.

*General description*

Figure 1:
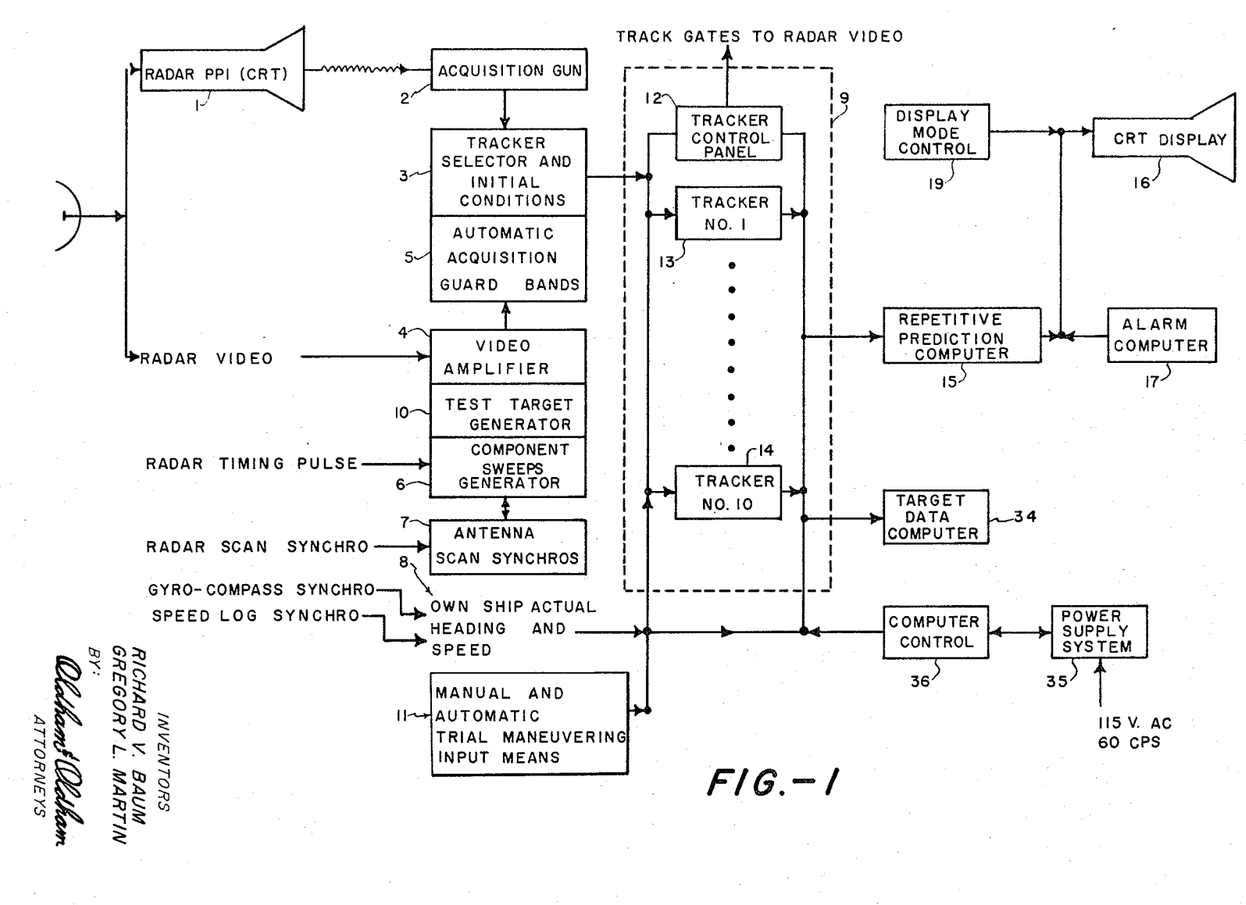
FIG. 1 is a block diagram of the overall system comprising the embodiments of the invention.

With specific reference to the form of the invention illustrated in the drawings, and particularly with reference to FIG. 1, the numeral 1 indicates a standard shipboard radar plan position indicator (PPI) or cathode ray tube (CRT) used to detect present target position of ships or vehicles in true or relative relationship. An ascquisition gun 2 can be used to pick up the position of a plurality of tragets from the indicator 1, and transfer this information to the tracker selector and initial conditions section 3. The use of the acquisition gun 2 is normally manually effected. However, in lieu thereof a radar video signal can be put into a video amplifier 4, which amplifier then sends its signal to the automatic acquisition guard bands section 5, where the information is then automatically placed into the tracker selector and initial conditions section 3. This type of signal detection is well known in the art. For example, see "An Introduction to the Statistical Theory of Communications" (New York, McGraw-Hill, 1960) and is noted to be particularly adaptable to selecting information from radar as set forth in an article "Signal Detection" by Wilson P. Tanner, Jr., University of Michigan, beginning at page 755 in the Encyclopedia of Electronics, Reinhold Publishing Co., 1962. For a more specific detailed indication of an exact circuitry that might be utilized reference should be had to the description beginning on page I–83 in Chapter I of Technical Manual—Experimental Radar Data Computer—Prototype No. 1, held by U.S. Department of Commerce, Maritime Administration, Washington, D.C. 20231, and Fig. 9 and schematic A 19N007–002.

Thus, the coordinates of the initial target position are fed to the tracker selector section 3 either automatically or manually. Initial condition techniques are well known in the field of analog computers, and hence section 3 may readily utilize any of these techniques. For example, tracker selection may be controlled automatically by a stepping relay similar to what is done in telephone circuits to select the next available line when a new call is initiated, or a manual dial may be provided to advance the stepping relay to a particular tracker if the operator should so desire. The actual information put in through section 3 is detected by the gun 2 or section 5 and then is used in a tracking section 9, as more fully described hereinafter.

In order to provide proper calibration of the signals from the tracker selector section 3, the signals are generated in synchronism with the radar sweep. Particularly, this requires range sweeps that are synchronized with radar range sweep and scan angle. This synchronism requires three signals from the shipboard radar PPI or CRT 1. These are (1) the radar timing pulse placed into the component sweep generator 6; (2) the radar scan synchro signal placed into the antenna scan synchro 7; and (3) to provide proper north-reference, the gyrocompass synchro signal is combined with own ship actual heading and speed information 8. The gyro-compass synchro signal is also used in conjunction with the speed log synchro signal to generate own ship true rectangular velocity components by any well known logic circuit or servo mechanism and these components are represented as own ship's heading and actual speed indicated by numeral 8.

The outputs from the tracker selector section 3, video amplifiers section 4, component sweeps generator section 6, and own ship's actual heading and speed are fed into the tracking section generally denoted by the numeral 9 as enclosed by the dotted lines. Note also, however, that a target test generator section 10 can feed a test signal into the tracking section 9 to determine if the apparatus is working properly. Also, manual and automatic trial maneuvering inputs 11 may be provided which are applied independently to the repetitive prediction computer 15 and may be used to test how the maneuvers of the carrying vessel will effect the target situation.

The section 6 is a common circuit used in radar, television and oscilloscopes. In this instance the circuit may consist of a sweep generator which is used to excite a resolver, the shift angle of which is controlled by the heading of the ship and the radar antenna position so that the resolver outputs are sweep proportional, in the specific circuit example given hereinafter with respect to section 9, to the north and east components of the angle at which the radar antenna is pointing. This is why section 6 receives a direct input from the antenna scan synchros 7. For a more detailed description and a suitable schematic diagram that might be used for the section 6 reference should be had to pages I–101 through I–107 of the Experimental Technical Manual referred to above.

It is well known in the art to utilize a test target generator in association with radar, and in the apparatus of the invention it may be accomplished by providing a set of video pulses which simulate those received from a target by the ship's radar. The apparent azimuth of the test signal could be controlled by a rotating cam synchronized with the radar antenna scan, and the apparent range may be controlled by any conventional time delay circuitry triggered in synchronism with the radar pulse repetition frequency. This time delay may be gradually reduced so that the test target appears to be moving toward own ship, or if the cam gradually is rotated relative to the antenna scan, the path of the simulated target will plot a passing course with own ship. A suitable test target generator would be one embodying the apparatus described which operates a pulse of about the same length as the associated radar's own transmitted probe which begins operating at an apparatus range of say 10 miles which has an apparent velocity towards one's own ship of say 10 knots, which occurs over a radar scan angle about equal to the radar's own angular resolution and which is left in operation long enough for the trackers to reach a steady state condition of operation so that the resulting courses, speeds, and positions shown on the display can be checked against the known characteristics of the test target. Such is all within the knowledge of one skilled in the art.

Naturally in conjunction with the test target generator 10, or during an actual situation, simulated input such as inputs 11 could be introduced to indicate own ship maneuvers, all as well recognized by one skilled in the art. For example, servo mechanisms may be used to supply trial, rather than actual speed and course data to readily provide information on what such trial own ship maneuvering would accomplish. For a much more detailed discussion of a suitable apparatus that might be used to accomplish trial maneuvering reference should be had to pages I–112 to I–126 as well as Drawings A–19N015–002 Sheets 1 and 2 of the Experimental Technical Manual referred to above.

The tracker section 9 contains a tracker control panel 12 and a plurality of tracker units of which number 1 denoted by 13 and number 10 denoted by 14 are shown. Although the unit illustrated contains 10 tracking units, a unit in actual operation could contain more or less than than this number. Each tracker unit is designed to track one target as selected automatically by the automatic acquisition guard band section 5 or manually by the acquisition gun 2. The tracker control panel 12 displays auxiilary information computed by the tracker as well as providing operator controls. Warning lights indicate that a tracked target is maneuvering, and other warning lights indicate that the target signal has been lost for several scans. Additional lamp indicators give the condition of the tracker, as tracking, stand by, and ready. Controls are provided for dumping targets from trackers, for temporarily deleting tracks, and for sending gates to the visual presentation on the indicator 1. The gates represent each tracker in operation and are returned to the indicator 1 to display a gate background on the radar display about each target being tracked for the convenience of the human operator. The trackers automatically dump any target reaching a chosen maximum repetitive prediction computer range, which usually is set for about twenty nautical miles. A complete and detailed description of the tracker section 9 will be covered later. Any conventional electrical circuitry for the lamps and control switches of panel 12 may be utilized. The panel 12 may be considered similar in purpose to the control panel for one's home television set, but on a more elaborate scale.

The outputs of the trackers 13 and 14 and the tracking section 9 are sequentially sampled and processed to generate predicted tracks of all targets tracked in both true and relative modes by the repetitive prediction computer (RPC) 15. The predicted track time has been arbitrarily set for 30 minutes, but could be set for a longer or a shorter period of time. The RPC unit 15 also provides the predicted track of own ship in true mode as well as two alarm circles, a visual range-measuring circle, and a cursor line. Outputs of the unit 15 are displayed on the cathode ray tube display 16 and used by the alarm computer 17 to determine track violation of alarm thresholds. A further feature of the RPC unit 15 provides for both manual and automatic trial maneuvering of own ship's velocity or course to solve the problem of a potential collision situation. Trial maneuvering is done in conjunction with the trial maneuvering unit 11 providing input signals to the repetitive prediction computer section 15. The execute time of the trial maneuver can be selected at any time during the half-hour prediction. To minimize equipment complexity, maneuvers are treated as instantaneous.

It is felt that the calculations necessary can be carried out most readily in an electronic analog computer on a reptitive or cyclic basis. In this manner each solution will be completed in a few milliseconds so that the repetition rate can be high enough to cause no noticeable delay in the operation of the alarm thresholds of the alarm computer 17. Thus, it is felt that the repetitive prediction computer 15 can be a standard computer unit, however, in addition, a specific computer has been proposed herein which will be more fully discussed later.

The alarm computer 17 gives both visual and audio alarm indications and has a timed audible inhibit system for both a danger and caution alarm zone. Each alarm zone threshold range can be set independently to the desired range, which, for example, could be 5 nautical miles for the caution zone and 2½ nautical miles for the danger zone. Since conventional analog computer techniques are utilized it is a simple matter to represent the alarm zones as a voltage and to compare this with a voltage representing the predicted closest range of each target tracked to own ship. Naturally, if the voltage representing predicted closest range falls within the alarm threshold, the alarm signal will be given. Conventional circuitry and techniques may be readily utilized for these purposes. The alarm gates $AG_1$ through $AG_{10}$, defined later, operate with the computer 15 to this end. For a more detailed circuit description of a suitable circuitry for the alarm computer 17, reference should be had to pages I-146 to I-159 of the above identified Experimental Technical Manual.

The cathode ray tube display 16 can be selected from four combinations of bow-up/north-up, and true/relative. The display mode control unit 19 controls the mode of display on the CRT display 16. The half-hour predicted tracks of each target sent from the RPC unit 15 is written as a line or trace on the CRT display face indicating its position at present and for thirty minutes of future travel. The line is broken into six segments, each representing five minutes of travel. Predictions of relative position greater than thirty minutes can be estimated by visual extrapolation.

*Principles achieved*

Figure 5:
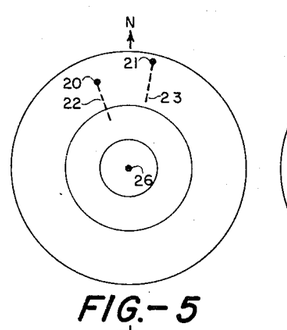
FIGS. 5 and 5a are pictures of the CRT Display scope showing a predicted situation that could result in a collision.
Figure 5A:
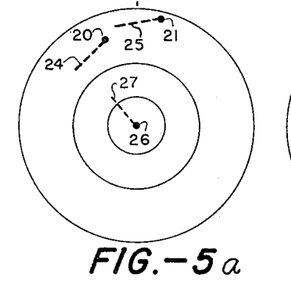

As an illustration, FIG. 5 shows a relative mode display and FIG. 5a shows a true mode display with target ships 20 and 21 having future tracks 22 and 23 respectively and carrying vessel 26 having course and speed line 27 displayed on the CRT display 16. This situation as illustrated might result in a collision if no action is taken, since target ship 20 has a closing range and a constant bearing and target ship 21 will pass close to the carrying ship 26; the potential danger is made evident in FIG. 5, the relative mode, in which the carrying vessel appears always at the center of the display. FIG. 5a, the true mode, makes evident that the approaching vessels are on the starboard side of the carrying vessel and that consequently, according to the rules of the road, the carrying vessel must take action.

Figure 6:
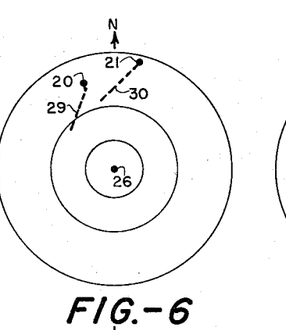
FIGS. 6 and 6a are pictures of the same CRT Display scope as FIGS. 5 and 5a but showing how the predicted situation is altered by a change in course of the carrying vessel.
Figure 6A:
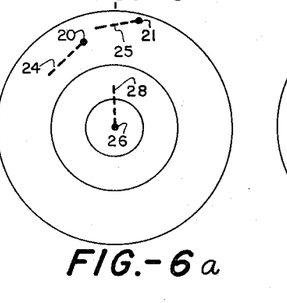

FIGS. 6 and 6a show an improved situation due to a change in course of 50° to starboard of the carrying vessel 26 after 5 minutes. Note that target ships still have the same true courses and speeds 24 and 25 as in the previous situation (FIG. 6a); however, since the course 28 of the carrying vessel has been altered 50° to the starboard, the relative tracks 29 and 30 (FIG. 6) of the target ships 20 and 21, respectively, have shifted to the left so that it is evident they will be kept well clear of the carrying vessel.

Figure 7:
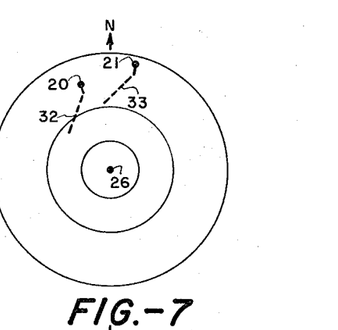
FIGS. 7 and 7a are pictures of the same CRT Display scope as FIGS. 5, 5a, 6, and 6a, but showing how the predicted situation is altered by a reduction in the speed of the carrying vessel.
Figure 7A:
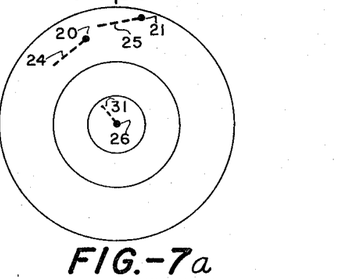

FIGS. 7 and 7a also show a remedy to the danger by decreasing speed of the carrying vessel 26 after 5 minutes. Note therein that the speed change 31 to the carrying vessel 26 causes the relative tracks 32 and 33 of the target ships 20 and 21 to again shift to the left so as to keep them well clear of the carrying vessel.

By using the manual and automatic trial maneuvering section 11 as an input into the RPC 15 one can readily determine what the resultant change will be on the relative situation without actually maneuvering the carrying vessel 26.

A target data computer 34, as shown in FIG. 1, digitally displays six items about the target in any one of the ten trackers selected. These data are range, true bearing, true course, true speed, closest point of approach (CPA) range, and closest point of approach (CPA) time. The CPA range and CPA time are computed only over the half-hour predicted tracks. Utilizing well known techniques to one skilled in the art the inputs of target ship data and own ship data can be supplied to servo mechanisms to solve the trigonometric equations necessary to provide the desired outputs from the computer 34. For specific examples of this type of servo mechanism see, "The Radiation Lab Series," published by McGraw-Hill, particularly Volume 25, Theory of Servomechanism and Volume 27, Computing Mechanisms and Linkages. For a more specific description of the details of a suitable circuitry for the target data computer reference should be had to pages I-135—I-145 in Chapter I of Technical Manual Experimental Radar Data Computer, Prototype No. I as held by U.S. Department of Commerce, Maritime Administration, Washington, D.C. 20231, as well as schematic A19N012-002 in Volume II thereof.

To complete the basic fundamental units shown in FIG. 1 a power supply system 35 is supplied with a 115 volt AC, 60 cycles per second input, and which power supply system 35 feeds the entire system through a computer control panel 36. The panel 36 is of a conventional type associated with analog computers for control. It may, and generally does, contain switches to turn the computer 34 from off to standby to allow a proper warm up period, to control focus and intensity of the CRT display, and, of course, any other control functions deemed necessary all as well known in the art. The power supply system 35 is particularly adapted for use with this system, however, it contains conventional power supply apparatus, and will not be explained in detail.

*Tracker description*

Figure 2:
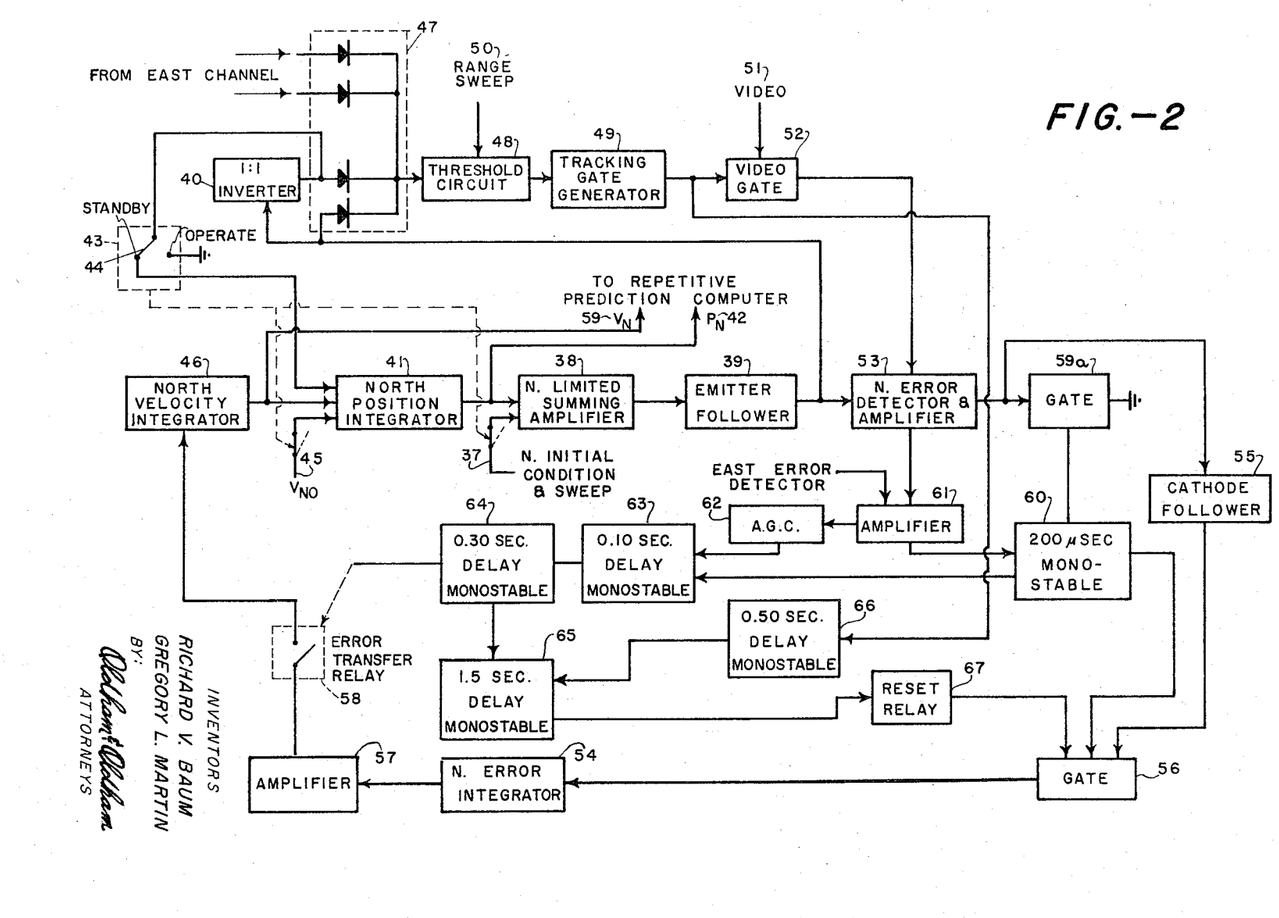
FIG. 2 is a block diagram of the north tracking loop and its tracking switching loop of one of the tracker circuits of the invention.
Figure 3:
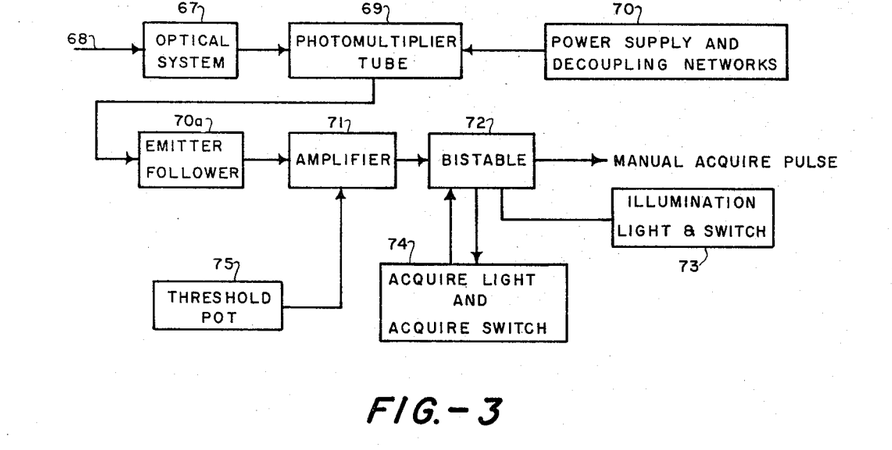
FIG. 3 is a block diagram of a target acquisition gun used to manually acquire target information for feeding into the tracking section.

Having described the basic parts of the radar data computer and indicator system as shown in FIG. 1, reference should now be had to FIG. 2, wherein one of the trackers will be described. The basic function of each tracker is to provide output voltages proportional to the north and east relative position coordinates and output voltages proportional to the north and east true velocity coordinates of the ship it is assigned to track. Each tracker also provides auxiliary outputs indicating lost target, indication of maneuvering target, indication of whether the tracker is in standby, ready, or operating, and indication, to the radar, of which target it is tracking. Each tracker consists of two identical signal processing channels, the north and the east, and of some common timing and switching circuitry. FIG. 2 shows generally only the north tracking loop and most of the common timing and switching circuitry. For example, components 49, 50, 51, 52, 58, 60, 61, 62, 63, 64, 65, 66 and 67 are common to the north and east loops.

The information which a radar supplies is normally in a polar coordinate system, orientated with respect to the bow of own ship. This coordinate system is not unfortunately, suitable for use within the trackers. The requirement that the tracker output "coast," or in other words continue to move the predicted position of the target along even though the target was not visual on the radar for some minutes, necessitates the use of doubly-integrating computing loops which can be accomplished most readily in a cartesian coordinate system. A reference example of the use of doubly-integrating computing loops would be generation of a sine or cosine function in an electronic analog computer. To minimize the effect, on such computing loops, of carrying vessel's maneuvers, the loops must be operated in a fixed north oriented relationship as it is necessary to subtract the velocity components of the carrying vessel. The direct outputs of the tracker are north and east components of the range to the target and the north and east true velocity components of the tracked target. The trackers thus combine the operation of tracking, smoothing, and coordinate conversion. They operate in a track-while-scan mode and are designed to ignore the other targets on the radar. Each tracker has a carefully controlled amplifying loop since the radar data from the tracked target is available only during a few microseconds out of each scan period.

During tracking, therefore, the tracker generates a gate coincidence with the time when the scanning element of the radar is within a small fixed area surrounding the tracked target. This gates only the radar video from this area into a tracker position comparison circuit (not shown), and rejects all other video. This same gate is sent to the radar video to add a pedestal on the tracked target, thereby providing indication, to the radar, of which target it is tracking. The other indications (i.e. lost target, maneuvering target, and tracker mode) are lamps, which, with tracker operating controls, are all combined in the tracker control panel 12.

Therefore, with particular reference to FIG. 2, a north initial condition and sweep signal indicated by numeral 37 is received from the tracker selector initial conditions unit 3 and inserted into the north limited summing amplifier 38. This amplifier 38, together with the emitter follower 39, the 1-to-1 inverter 40 and the north position integrator 41 forms a closed loop during initial condition insertion. Less than two seconds are required for this loop to charge the north position integrating capacitor (not shown) so that the voltage $P_N$ indicated by 42 is equal to the negative of the initial condition. At the end of a two second interval from start of insertion, the tracker selector and initial conditions section 3 delivers a trigger to put the standby/operate bistable 43 from standby condition to operation condition. As a means of showing tracker availability the actuation of the bistable 43 in a respective tracker may trigger turning on of a visual tracking light to indicate that the tracker is in use and is not available. In a similar manner, when the tracker is turned on and warmed up the bistable 43 will be in standby and may trigger a standby light to indicate the tracker is available. When the tracker is in tracking condition the bistable switch 47 is on operate which sends an enable signal to the repetitive prediction computer 15. Naturally, the apparatus may be designed so that when neither the standby nor tracking circuits are energized then no lights will be actuated to indicate that the tracker is not energized and thus not available. The bistable 43 controls two relays with several contacts. Some of the contacts interrupt the path from the 1-to-1 inverter 40 to the input of the north position integrator 41, as by switch 44 being opened or at the operate position. The bistable 43 also switches the input to the north limited summing amplifier 38 from the north initial condition 37 to the north sweep condition input 45, as indicated by letter designation $V_{NO}$.

The north position integrator 41 now has outputs that are at the proper initial DC level whereas the outputs from the north velocity integrator 46 are still approximately zero. The output of the north position integrator $P_N$ at 42 and the input denoted by $V_{NO}$ from the north initial sweep condition 37 are compared and the difference is amplified in the north limited summing amplifier 38. The output of the amplifier 38 is an amplified position of the sweep centered around the DC level of the north position integrator 41. This output goes directly to an emitter follower 39. The output of the emitter follower 39 has a portion thereof sent to a 1-to-1 inverter 40. The output from the inverter 40 as well as directly from follower 39, and the corresponding two from the east channel are applied to a 4-diode gate enclosed by the dotted lines and denoted by the number 47. The output of this gate is proportional to the magnitude of the larger deviation of either sweep component from the stored position. A threshold circuit 48 uses this signal deviation from the zero reference level to form a tracking gate which is inserted into the tracking gate generator 49.

The tracking gate occurs only during the time when this signal is within a threshold level of the zero reference. The threshold level is varied as a function of range by a range sweep signal 50 inserted into the threshold circuit 48. This is to increase tracking gate size in proportion to range to accommodate the increase of radar scanning element size. The radar scanning element size increases in size in the azimuth direction directly with range because of the fixed angle of the scanning beam.

It is an easy matter for one skilled in the art to provide a visual indication on the radar PPI of which targets are being tracked. For example, if the output pulses from each tracking gate generator 49 of each tracker are summed with the video signal driving the radar PPI, each tracked target will appear with an illuminated area of the shape of the tracking gate surrounding it. Such illumination of each tracker might then be controlled in intensity to determine visually which tracker is on which target.

The tracking gate occurs at the proper range and azimuth to gate the video input 51 from the target through the video gate 52. This gated video and the sweep waveform of the north channel from the emitter follower 39 enter the north error detector and amplifier 53. This applied error signal is gated into the north error integrator 54 after passing through the cathode follower 55 and the gate circuit 56. The integrated error signal from the north error integrator 54 is amplified in amplifier 57 and gated into the north velocity integrator 46 by the error transfer relay 58. As the error transfer relay 58 keeps putting error signals into the north velocity integrator, this output, $V_N$ denoted by numeral 59, will integrate either positive or negative depending upon the north velocity component of the target. $V_N$ denoted by 59, is integrated in the north position integrator 41 to obtain $P_N$ denoted by numeral 42, which changes slowly in correspondence with the movement of the target in the north direction. The loop is thus closed. If the target that is being tracked maintains constant heading and speed, $V_N$ denoted by 59, will reach the level corresponding to the north velocity components of target and the error signal in the loop will minimize to small corrections. If the target should change velocity or heading, the video will move with respect to the center of the tracking gate and definite error signals will be generated changing the north velocity and position to bring the error back to minimum. The new velocity will accumulate. If the target movement should be radical the voltage fluctuations representing velocity will become large. If a voltage threshold value is established, voltage fluctuations above this value may actuate a circuit to indicate by a visual signal that the target is maneuvering.

A smoothing time of approximately three minutes for a step change in velocity has been set into the loop. The loop includes damping and phase shift because it basically is a type-two servo system. The gain can be varied within limits to change smoothing time. The three-minute smoothing time was selected as a compromise between closely following real velocity changes and rejecting noise, bad information from the radar, and apparent velocity changes.

*Stabilizing and reset circuitry for tracker*

A gate 59a and two hundred microsecond mono-stable 60 are provided to stabilize the error integrator between error transfer cycles. The gate 59a, as seen only in FIG. 2, clamps the output of the north error detector amplifier 53 to ground, once each error transfer cycle in order to recharge the error transfer capacitors normally used in an amplifier for these purposes.

The reset circuitry is shown at the right hand side of FIG. 2, wherein the north error detector and east error detector signals are each signal-amplitude detected, summed together, and amplified by amplifier 61, for application to the automatic gain control (AGC) circuit 62. Because the AGC 62 builds up on video magnitude it is used to determine whether or not an error transfer should be made, and to modify the error transfer inversely with signal-amplitude. The AGC effect is to help make tracking somewhat independent of target signal amplitude over a usable signal magnitude range. A small video pulse is sufficient to pass through the amplifier and trigger the two hundred micro-second mono-stable each PRF. When the signal from the AGC 62 is of sufficient magnitude, the two hundred micro-second mono-stable 60 will trigger the 0.1 second error transfer delay mono-stable 63. In so doing, the decision has been made that sufficient video is present for good error transfer during this scan. Naturally, it would be well within the purview of one skilled in the art to include conventional circuitry to indicate by a visual light a lost target when the signal from the AGC 62 is not of sufficient magnitude on several consecutive passes to have the 200 micro-second mono-stable trigger the mono-stable 63. At the end of its delay, the 0.1-second mono-stable 63 triggers the .3 second error transfer mono-stable 64. This mono-stable duration has been picked nominally at .3 second, thereby varying inversely with AGC magnitude to minimize error dependence on target signal amplitude. A 1.5 second re-setting mono-stable 65 is triggered either by the leading edge of the gate from the error transfer mono-stable 64 or indirectly by the signal from the tracking gate generator 49 through the .5 second reset delay mono-stable 66. The leading edge of any tracking gate pulse will trigger the .5 second reset delay mono-stable 66 whose trailing edge will then trigger the reset mono-stable 65. The reset operates as follows:

Reset is thus initiated by error transfer if error transfer takes place and in the absence of error transfer, reset is initiated by the leading edge of the tracking gate. If the ship tracked is at very close range the tracking gate remains on throughout the radar scan and thus reset can be initiated only by error transfer.

When a small target is in the antenna beam there are approximately 50 video pulses received when an average PRF rate, antenna beam width, and antenna scan rate are used. Thus, with each scan of the antenna the tracker receives approximately 50 bits of information from the target. The video gate 52, tracking gate generator 49, and the two hundred micro-second mono-stable 60 operate about 50 times. The reset delay mono-stable 66, reset mono-stable 65, error transfer mono-stable 64, and the error transfer delay mono-stable 63 only operate one time during each antenna scan.

*Tracker Controls*

An automatic maximum range dump circuit, usually set at about 20 miles, is built into the tracker (not shown) and is used to trigger the standby/operate bistable 43 to standby if a target goes beyond the maximum range. This circuitry is shown on pages I-34 and I-35 of the above identified Experimental Technical Manual.

Whenever a target is lost, or is maneuvering, it is a matter of simple circuitry, as pointed out more fully above and on page I-35 of the manual, to detect these changes and so indicate by lights on the tracker control panel. A target dump button is also mounted on the tracker control panel which grounds a lead to the standby/operate bistable 43 to return the tracker to standby. This control is used to dump targets no longer of interest, or no longer available.

*Target acquisition, manual and automatic*

Target acquisition, as explained earlier is performed principally by the automatic acquisition guard bands unit 5 for automatic acquisition, and the acquisition gun 2 for manual acquisition. The tracker selector and initial conditions unit 3, as seen in FIG. 1, upon receipt of an acquire pulse from either the acquisition gun 2 or the automatic acquisition circuit 5, or upon receipt of a test video trigger, generates initial target position voltages and sends these voltages to an available tracker unit where the voltages actuate the tracking loops so as to set the output voltage of integrator 41 to a value corresponding to the target distance north at the time of acquisition.

Usually, the automatic acquisition circuit 5 processes the radar video in 8 guard bands, each about .10 to .15 nautical miles wide, spaced every two to three nautical miles in range. This is to improve the signal to noise ratio and set up a threshold to detect targets appearing in the band and discriminate against noise. When a target is detected it generates an acquire trigger which is transmitted to the initial condition circuit when automatic mode is used. The automatic acquisition mode is designed for use where a limited number of discrete targets appear within radar range and acquisition will be made unattended. When numerous adjacent targets are within range, its use is not recommended. If used, it will select targets at random to fill up the trackers available. Many of the track targets may be of little interest and, likely, many interesting targets will remain untracked. The manual acquisition mode by means of the acquisition gun 2 can be under under any circumstance. However, the trackers do require that the tracked target have a peak signal, which is large compared to other signals from its vicinity.

*Acquisition gun*

Manual acquisition is effected by having the tracker control panel 12 properly set in manual, then aiming the acquisition gun 2 at the desired target on the radar display and pulling the trigger. The target acquisition gun 2 is a photo electric device which detects targets on the radar display 1 and generates the manual acquire pulse.

Figure 4:
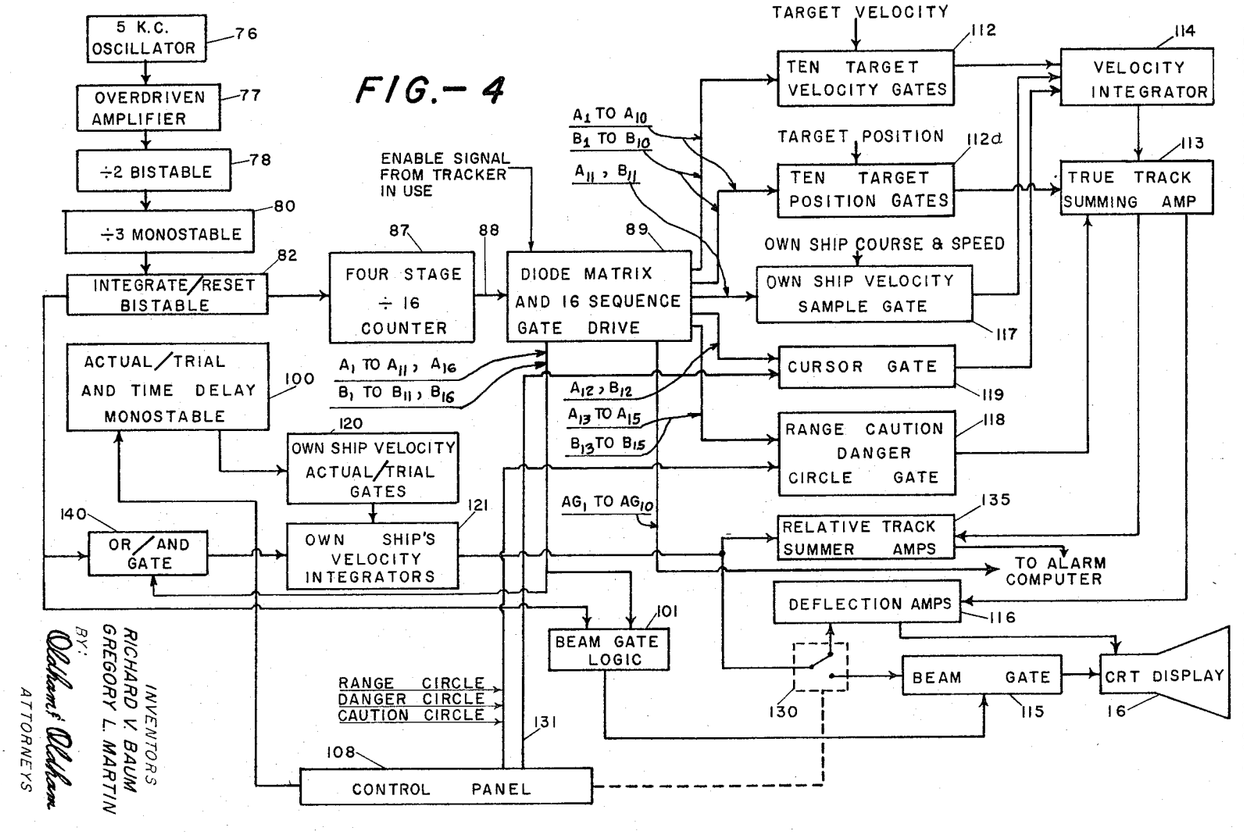
FIG. 4 is a block diagram of the repetitive prediction computer which receives its input driving signal from the tracking section, and has its output displayed on the CRT display.

As best seen in FIG. 4, the target acquisition gun includes an optical system 67 designed to pick the radar pulse 68 and transmit to a photo multiplier tube 69. A power supply and decoupling network 70 is provided to operate the photo multiplier tube 69. The signal from the photo multiplier tube 69 is transmitted to an emitter follower 70a and thence to an amplifier 71 where the signal is amplified and sent to a bistable 72 for further transfer into the tracker selector and initial conditions unit 3. The optical system 67 permits selection of the desired target by allowing the operator to center the target in an illumination ring generated by the illumination light and switch section 73. In addition, the optical system has a dichroic mirror which will pass substantially only blue light on to the photo emissive cathode of the photo multiplier tube 69. The illumination light and switch 73 is on the gun handle. It generates a red illumination ring and prevents the bistable 72 from changing state until such red illumination ring is displayed on the radar scope. An acquire light and acquire switch section 74 is provided to prevent the bistable 72 from changing state, due to extraneous inputs, until the operator is ready to acquire and depress the trigger. Therefore, both switches 73 and 74 are operated sequentially as by pressing the trigger of the acquisition gun 2, and provide a double safety feature to insure that only proper target information is transmitted to the tracker by the manual acquisition gun 2. In the normal sequence the illumination switch 73 is depressed when the gun 2 is picked up, the desired target is circled with the red illumination ring, and switch 74 is depressed when the operator is ready to acquire that target by detecting the blue light which is normally emitted from the radar PPI by each target. In order to insure that only pulses of a certain minimum voltage can trigger the bistable 72, a threshold potentiometer 75 is provided. The threshold setting on the potentiometer 75 is effected by an external screwdriver adjustment made to suit the conditions of the particular radar repeater being used. It has been found that the efficiency of the optical system is approximately 80%, hence a light flux of approximately .66 picolumen to .66 nanolumen entering the objective lens is necessary for the generation of the manual acquire pulse out of the bistable 72.

Automatic acquisition

The purpose of the automatic acquisition unit is to enhance the signal to noise ratio of the radar video and to trigger the initial conditions circuit on a certain threshold of resulting signals. The purpose is to detect and acquire radar targets automatically and discriminate against noise. Therefore, effective discrimination is primarily dependent upon the nature of the video signal. The circuit utilizes the principle of a comb filter to minimize noise that does not have a periodic component over a number of PRF periods. However, where noise has this effective periodic component, false alarm rates can be high, even with thresholds that reject weak targets. The processing technique requires that the filters operate nearly on the smallest range resolvable element and over a number of PRF periods in order to enhance signal to noise ratio. As explained before, the automatic acquisition circuit processes the radar video into eight guard bands spaced equally apart so that the video within these guard bands is sampled in eight adjacent range increments. The width of the guard band is selected so that the fastest expected radial relative motion between the target and carrying vessel would not permit the target to get through a guard band within one revolution of the slowest scanning antenna.

Therefore, the sampled, low-pass filter elements of the process simulate a linear filter with a comb filter spectrum. This spectrum passes a band of frequencies about the PRF and each of its harmonics. The filter builds up full amplitude to a step input in ten to fifteen periods. It is this build-up which is thresholded for the acquire pulse. This type of circuitry is well known in the art. For example, the timing and control of such a filtering circuit is shown in United States Patent 3,142,822. A much more detailed description of an automatic acquisition apparatus and circuit diagrams that would be suitable to accomplish the target acquisition features of the invention are given on pages I–73 to I–97 and drawing A–19N007–002 of the above cited Experimental Technical Manual.

Repetitive prediction computer

The repetitive prediction computer section of the radar data computer and indicator system will be described. As explained previously the RPC15, of FIG. 1, contains the basic gating and timing elements and circuits to sample sequentially, and predict tracks from the trackers computed data and own ship's input data. Included also in its sampling sequence are alarm circles, range circle, and cursor line signals. The RPC provides its output data and timing to the alarm computer 17 and the CRT display 16, also of FIG. 1. To obtain relative data, carrying vessels predicted track is subtracted from target tracks. An electronic commutator with 16 positions is used to sample the outputs of the 10 trackers, own ship, cursor lines, and the range, danger, and caution circles. The 16th position is used to reset all the operational amplifiers.

With reference to FIG. 4, a five k.c. oscillator timer 76 provides the basic timing for the entire computer. The output from timer 76 is amplified in the over driven amplifier 77 and then divided by two in a bistable 78. The outputs of the bistable 78 are sent to a divide-by-three mono-stable 80. The output of the divide-by-three monostable 80 is also divided by two in the integrate-reset bistable 82. The divide-by-three monostable 80 is a simple means used to reduce the frequency of the signal from bistable 78. The bistable 78 is a convenient source of bipolar signals for actuating clamps and for "chopping" when the frequency is too high to set a convenient repetition rate for the repetitive computer.

The output from bistable 82 triggers the first stage of a four-stage bistable count chain 87. Count chain 87 divides the signal by 16 and the 16 outputs 88 go to a diode matrix 89. The enable signal from each respective tracker in use actuates its respective part of the matrix 89. There are 16 outputs from the matrix 89, denoted A1 through A16. Each A number is inverted to produce a B number at the same time, but of the opposite polarity. The first ten pulses, A1 through A10, and B1 through B10 are used to gate information from each corresponding tracker. A11 and B11 gate own ship information in gate 117. Note that these pulses A1 to A10 and B1 to B10, serve to gate respective outputs from the tracker section in gate 112 of FIG. 4. A12 and B12 control the cursor line gate 119. The range, danger, and caution circle gate 118 are operated by A13 through A15, and B13 through B15. A16 and B16 are used to balance all of the operational amplifiers. The alarm gate signals AG1 through AG10 are also generated by the diode matrix 89. AG1 occurs at the same time as A2, AG2 occurs at the same time as A3, and so on. These alarm gates are used in the alarm computer 17.

A1 through A11, and A16 are summed in a beam gate logic circuit 101 along with another output from bistable 82. A beam gate waveform is generated by the circuit 101 and its associated circuitry. The circuit 101 also turns the beam on during the latter half of the waveform of each A number. This allows the integrators and amplifiers to settle down before the information is displayed on the cathode ray tube display. Waveform B16 is also coupled to the circuit 101 and is used to prevent any beam gate during the 16th commutator period. The breaks in the display of targets 1 through 10 and own ship denote 5 minute markers, but they could be set for any convenient break time. These breaks are generated and summed in circuit 101 to turn off the beam gate 5 times during each period of A1 through A11. The collector waveforms of the circuit goes to a beam gate 115 and then is used for drive to the grid of the cathode ray tube display 16.

With specific reference to FIG. 4, the resultant uses of the waveforms and gates generated will hereinafter be explained.

Velocity and position information from the signals $V_N$, $P_N$, $V_E$, and $P_E$, $O_C$ and $O_S$ from the trackers and own ship are gated in proper relation as indicated in FIG. 4 through gates 112, 117, 118, and 119 of the computer in commutator fashion. The gates 112, 117, 118, and 119 that do the switching are basically six-diode gates with a high impedance output and very low leakage from the input to the output. In the usual manner in analog computers, the velocity integrator 114 is a diode circuit which simply acts to integrate the signals from the gates 112, 117, and 119 and to reset or clamp the output of the integrator portion to zero at the completion of a computation, and hold it at zero until the clamp is released at the beginning of the next computation. The integrated velocity information from the velocity integrator 114 is summed with the position information from each of the 10 track pulses A1 to A10 and B1 to B10 through gate 112a in a true track summer 113. The time duration of the track pulse from gate 112 is twice the length of the pulse from the velocity integrator 114 because the velocity integrator is clamped during the first half of the waveform. Therefore, the signal from the velocity integrator 114 is summed with each track pulse for only the latter half of each track pulse. Thus, the first half of the signal from the true track summer 113 contains only true positional information, but during the latter half it consists of positional information plus the integrated velocity information. A beam gate 115 is provided which turns the CRT display 16 on only during the latter half of the tracking pulse. During the first half the deflection amplifiers 116 have moved to correct the position and when the beam comes on only the integrated track of a particular target is shown on the cathode ray tube. At the end of the track pulse, the beam gate also terminates, and the integrator 114 is clamped. This cycle operates during each commutator period on each track pulse.

After ten commutator periods all tracker outputs have been sampled and displayed if each tracker was in operation. During the 11th period own ship velocity is gated and integrated by gate integrator 117. Since carrying vessel is always at the center of the CRT display 16, present position is always at the center and therefore only a velocity gate is required. During the 13th, 14th, and 15th periods, the range, danger, and caution circles are gated through gate 118, with the resultant pulses sent to the CRT display 16. During the 12th period the cursor line gate is gated as by gate 119 and sent to the CRT display 16.

A carrying vessel's velocity integrator clamp gate 120 is used to control the carrying vessel's gate integrator unit 121. As with the velocity integrator 114, it is unclamped during the latter half of each track pulse that represents a tracker in operation, and during the latter half of the carrying vessel's gate pulse during the 11th commutator period. The output of the carrying vessel's gate and integrator unit 121 and the target integrator 114 are summed in summer 113 to in effect subtract carrying vessel's velocity component from each target that is displayed. Note, also, that these same integrated outputs (i.e. from integrators 121 and true track summer 113) are summed in a relative track summer 135 to send a signal to the alarm computer 17. Therefore, carrying vessel's velocity, as displayed on the CRT, is zero and its predicted track reduces to a spot. The velocity vectors of all the other targets are displayed as their relative track with respect to the carrying vessel which is the resultant vector achieved by substracting carrying vessel's velocity vector from the tracked target's velocity vector as described above. The above results occur in the relative mode of operation, which almost always would be used. However, in the true mode of operation, own ship's velocity vector and target velocity vectors are not summed, so that the true track of all the targets and the carrying vessel is displayed. This mode of operation will not conveniently visually predict CPA time or CPA range. However, the control to true or relative are made from control panel 108 through switch 130. The control panel 108 also is adapted to supply a DC cursor signal 131 to cursor gate 119, and a trial time signal 132 for trial operation to the delay monostable 100. The delay monostable 100 operates from the panel 108 to control the input signal to the integrator clamp gate 120, as either an actual or a test signal. Of course, the test signal helps find the best solution to avoid the tracked target. Also, the panel 108 can adjust the range, danger, and caution circles.

An OR/AND gate 140 is provided to receive signals from the bistable 82, and matrix 89 to send a signal to integrator 121 to provide clamp release only for those trackers actually in use.

The computations, with respect to a tracked ship, are carried out by operational amplifiers (common to the analog art) which are appropriately interconnected, to each other, and to the tracker outputs, so as to provide varying output voltages proportional to the expected future north and east position of the tracked ship as functions of time, starting at the present position and time.

The computations are carried out on a very compressed time scale so that the next 30 minutes of ship motions are computed and traced out on the CRT display in about a milli-second. Time scale compression is common in the analog art.

After one ship's track has been traced out, the timing means causes the operational amplifier to be re-set and to be connected to the next tracker so that the next ship's track is traced out within the next few milli-seconds.

The operational amplifiers are then switched from tracker to tracker in a repetitive sequence and thus regenerate the tracks on the display many times each second so that with a slow CRT phosphor the tracks do not appear to flicker or fade as in a TV system which also repeats each picture element many times each second.

The switching of amplifier inputs and outputs may be done by diode gates which are controlled by voltage inputs from the timing means, all techniques well known to persons skilled in the art. A more detailed description of a suitable computer for the purposes of the invention is given on pages I–44 to I–59 of the above identified manual, while a circuit diagram is shown in drawings A19N004–002.

Repetitive analog computers designed for compressed time scale operation were marketed during the 1950 era by G. A. Philbrick Associates.

*Operation*

Although the radar data computer and indicator system is internally complex, it is easy to operate and can provide a number of computation and display functions which should be valuable to navigation and collision avoidance. The unit is designed for a capacity of a plurality of targets, for instance ten as in the foregoing description. For operation at sea, usually there will be only a few ships visual on the radar and thus every radar target may be tracked and its course and speed etc. computed by the unit. In the vicinity of land, there will be many targets visual on the radar, some few of which are ships but most of which are land targets. It will be the operator's decision to choose which of them should be tracked or computed. The CRT display of the unit is very similar to the visual or graphic plots and resulting computations which have previously been performed manually using information from the radar. One major difference is that the unit continuously maintains and up dates the plots in computed data about all ships tracked as well as the carrying vessel. The unit also provides visual and audio alarms for targets having closer CPA's than desired. A more detailed description of the alarm computer 17 and associated circuit which will be suitable for the purposes of the invention is given in schematic A19N011–002 and on pages I–146 to I–160 of the above referenced Experimental Technical Manual.

In performing this task continuously, for a plurality of targets, the computer can represent, at least, the continuous efforts of a trained team of operators. The computer has the further advantage, in its own computations, of not making human mistakes nor of suffering from human fatigue. Its purpose is to facilitate earlier and more accurate appraisals of any navigational situation.

The unit has four principal areas of operations namely, target acquisition, tracking and computing data display, and own ship trial maneuvering. The tracker control panel contains the principal controls and indicators applicable to Tracker selection, acquisition mode selection, and individual tracker data control. Manual target acquisition is achieved by using the acquisition gun aimed at the target displayed on the radar PPI or CRT. Initial target position data is generated in the tracker selector and initial condition section which also does automatic acquisition when used in conjunction with the automatic acquisition guard bands when that mode is selected. The trackers, of course, generate the position and velocity data of the targets tracked, and give maneuvering and lost target warning on the tracker control panel. The trackers receive their data from the radar video, amplified in the video amplifier and passed to the tracker selector and initial conditions section. Additionally, the target test generator supplies a simulated test target to the trackers for test operation whenever this mode is selected on the tracker control panel.

The repetitive prediction computer generates half-hour predicted tracks of all targets tracked and a carrying vessel, and applies the data to the CRT display and the alarm computer. The alarm computer has controls and indicators for various alarm conditions as more fully described in the referenced pages of the manual. The display mode for the CRT is selected as any combination of true/ relative and bow-up/north-up. The CRT also displays the danger and caution alarm zones and has controls on the CRT unit to regulate the alarm zones.

The target data computer utilizes the outputs of the tracker, selected by the controls thereon, to compute and display 6 data about the target. These data are north-reference bearing and range, north-reference course, true speed, CPA time, and CPA range. The computer control contains the main switch for turning equipment on and off, the panel illumination control, and the CRT display controls. The display controls are focus, intensity, a variable electronic range circle, and an electronic true cursor bearing line. For a schematic circuit diagram of the target data computer, see drawing A 19N012–002 in the above cited manual.

It will be recognized that the objects of the invention have been achieved by providing a radar data computer and indicator system which is compatible with known radar equipment and simplifies the problem of collision avoidance of moving vehicles.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a radar target data computer and indicator system mounted on a carrying vessel the combination of radar means to detect targets and provide a target input information signal, a standard radar CRT scope to display the targets detected, tracker means to provide a tracker information signal representing the course and speed of the targets detected from the target input information signal, computer means receiving the tracker information signal to predict the future position of the targets tracked in relation to the carrying vessel and visually display the predicted tracks of the targets in relation to the carrying vessels on the CRT scope which is characterized by means to visually indicate which targets are being tracked on the CRT scope, and where said tracker means includes stabilizing and reset circuitry to selectively provide error information from the target input information signal which is sent to the computer means to correct the computed predicted future position of the targets tracked, and circuit means to provide target input information signals to the tracker means only upon the receipt of minimum strength and duration target input information signals from the radar means.

2. A data computer and indicator system according to claim 1 which includes means to display the predicted tracks of the targets and the carrying vessel on the CRT scope as broken lines, where the breaks in the lines indicate a predetermined time interval of travel along the predicted tracks, and means to display the true course and speed of the carrying vessel all targets tracked on the CRT scope.

3. A data computer indicator system according to claim 1 where said tracker means are divided into a plurality of tracking units with each unit adapted to track one target input signal, each tracking unit comprising at least two signal processing channels, said channels being essentially identical in circuitry and utilizing doubly-integrating computing loops to provide first outputs indicating the north and east relative position coordinates and second outputs indicating the north and east true velocity coordinates of the input signals to the tracker unit of the target being tracked, and a bi-stable incorporated into each tracking unit to indicate tracker unit availablity, a plurality of relays controlled by said bi-stable to selectively actuate the tracking unit and send tracker information to the computer means when the doubly-integrating computing loops stabilize indicating error transfer information is available.

4. A data computer and indicator according to claim 3 where each individual tracking unit includes a tracking gate which controls receipt of the target input information signals only during the time when these signals are within a predetermined threshold level, and wherein the circuitry controls the threshold level below a minimum to reject noise and above a maximum to reject land, weather or other extraneous information, and as a function of range to increase tracking gate size in proportion to range to accommodate the increase of radar scanning element size at various distances.

5. A data computer and indicator according to claim 4 which includes stabilizing and reset circuitry comprising a 200 microsecond mono-stable to stabilize the doubly-integrating computing loops between error transfer cycles, an amplifier to amplify the error information from each channel, and a gate to clamp the output of the amplifiers to ground once each error cycle.

6. A data computer and indicator according to claim 3 which includes a manual means to ground the bi-stable to return the tracker unit associated therewith to standby condition.

7. A data computer and indicator system according to claim 3 which includes an acquisition gun means to manually acquire targets from said CRT scope and provide such information to a selected tracker unit, said acquisition gun comprising an optical system, a photo-multiplier tube adapted to receive light signals from the optical system, a bi-stable adapted to receive the signal from the photo-multiplier, first light means to acquire the target on said CRT scope, second light means to point out the target to be acquired incorporated into the gun, adjustable threshold means to set a bottom limit to the signal strength of the target acquired to minimize noise pickup, double safety switch means to insure the acquisition gun is not activated until the desired time, and powers supply and decoupling means connected to the gun to provide operation thereof.

8. A data computer and indicator system according to claim 7 where the acquisition gun means operates within a light flux threshold of between .66 picolumen to .66 nanolumen entering the optical system.

9. A data computer and indicator system according to claim 1 where the computer means includes basic gating and timing elements to sample sequentially and predict tracks from the signals received from the tracker units, said elements subtracting carrying vessels predicted track from each target tracks to achieve the predicted movements of the targets with relation to the carrying vessel, a circuit within the computer means to generate a beam gate waveform which turns the beam of the cathode ray tube on only during the latter half of the sequential sampling of each target to allow the integrators and amplifiers in each tracker unit to settle down before the information is supplied to the beam for display on the cathode ray tube scope, a true track summer operating for each sequential sampling of each tracker unit which during the first half of each sampling supplies only true positional information to the CRT beam, but during the latter half of each sampling it provides positional information plus integrated velocity information to the CRT beam.

10. In a radar data computer and indicator system, the combination of a standard shipboard radar PPI scope, means to automatically acquire targets at a certain maximum range from said scope, acquisition gun means to manually acquire targets from said scope, tracker selector means adapted to receive the target signal from the acquisition means and direct it to said tracker means, a plurality of individual tracking units comprising said tracker means with each unit being adapted to track one target input signal, said tracking units comprising at least two signal processing channels, said channels being adapted to process at least north and east information, said channels being essentially identical in circuitry and utilizing doubly-integrating computing loops to provide output voltages proportional to at least the north and east relative position coordinates and output voltages proportional to at least the north and east true velocity coordinates of the input signal to the tracker unit of the target being tracked, a tracking unit to automatically dump targets passing beyond a pre-selected maximum range, means in each tracking unit to indicate lost target, maneuvering target, tracker availability, and indication of which target is being tracked, and means in each tracking unit to manually dump the target being tracked to clear the unit, a repetitive prediction computer means adapted to receive the output signals from the tracker means, said computer means comprising timing means for proper signal pulse wave interpretation, integrating means to sample sequentially each timed signal pulse wave, said sample sequence including each target pulse sampling, carrying vessel pulse sampling, and alarm circles, range circles and cursor lines pulse sampling, said sequential sampling being effected for every antenna sweep, means to reset all operational amplifiers after each sweep sequential sampling for the next sweep, said computer computing a predetermined time based linear prediction signal of the future predicted positions of all targets tracked, said output prediction signal being time serrated into short intervals to facilitate interpretation, and with aforesaid predictions based on true earth referenced target positions and carrying vessel velocity data in rectangular coordinates oriented with north referenced bearing, means to subtract carrying vessels predicted track from target track to obtain carrying ship referenced prediction signals, and target data computer means adapted to receive signal wave pulses from said tracker means to compute and visually display relative and true information about each target tracked, said information including range, true bearing, true course, true speed, closest point of approach range and closest point of approach time, a CRT adapted to receive the output time based linear signal pulses from said prediction computer and visually display the predicted target positions, said CRT adapted to display carrying vessels true course and speed from the center of the PPI sweep, means to control the display on the CRT, an alarm computer means adapted to receive the output signals from the prediction computer means, said alarm computer adapted to determine if a tracked target is going to enter a predetermined danger or caution range circle in relation to the carrying vessel, a visual and audible alarm means associated with said alarm computer means to signify when a target is going to enter said danger or caution range circles and which target is causing the alarm means to be energized, manual and automatic trial maneuvering means to initiate proposed changes of carrying vessels course and/or speed into the tracker unit to see what effect it will have on the future predicted relative positions of the targets being tracked, said trial maneuvering means being effeffcted to quickly decide what actual maneuvers should be made by the carrying vessel to most quickly avoid at the greatest range any target threatening a possible collision, test target generator means to provide test inputs into the tracker means to test the operation of the entire system, power supply means for the entire system, means to control the mode of operation of the tracker means in automatic or manual, and means to synchronize the radar timing pulse into the system with the radar video pulse from the carrying vessel's standard shipboard PPI scope.

References Cited

UNITED STATES PATENTS

| | | | |
|---|---|---|---|
| 2,849,707 | 8/1958 | White | 343—5 |
| 2,924,818 | 2/1960 | White | 343—7.3 |
| 3,078,457 | 2/1963 | Hilmer et al. | 343—7.3 |
| 3,188,633 | 6/1965 | Watt | 343—5 X |
| 3,212,086 | 10/1965 | Robinson | 343—5 X |
| 3,265,869 | 8/1966 | Gray | 343—112.4 X |
| 3,188,631 | 6/1965 | Birtley. | |
| 3,223,996 | 12/1965 | Voles | 343—7 |

RODNEY D. BENNETT, *Primary Examiner.*

C. L. WHITHAM, *Assistant Examiner.*